May 25, 1971    F. R. ZUMSTEIN    3,580,762
METHOD OF MAKING DOUBLE-WALLED PLASTIC ARTICLES
Filed Jan. 23, 1969    2 Sheets-Sheet 2
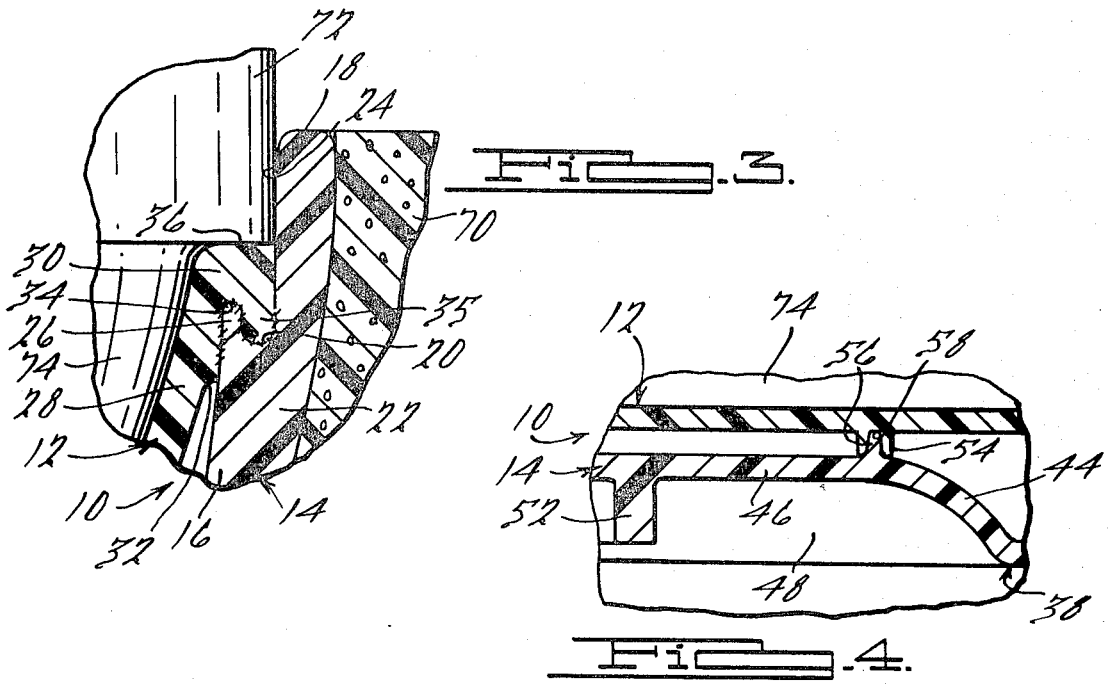
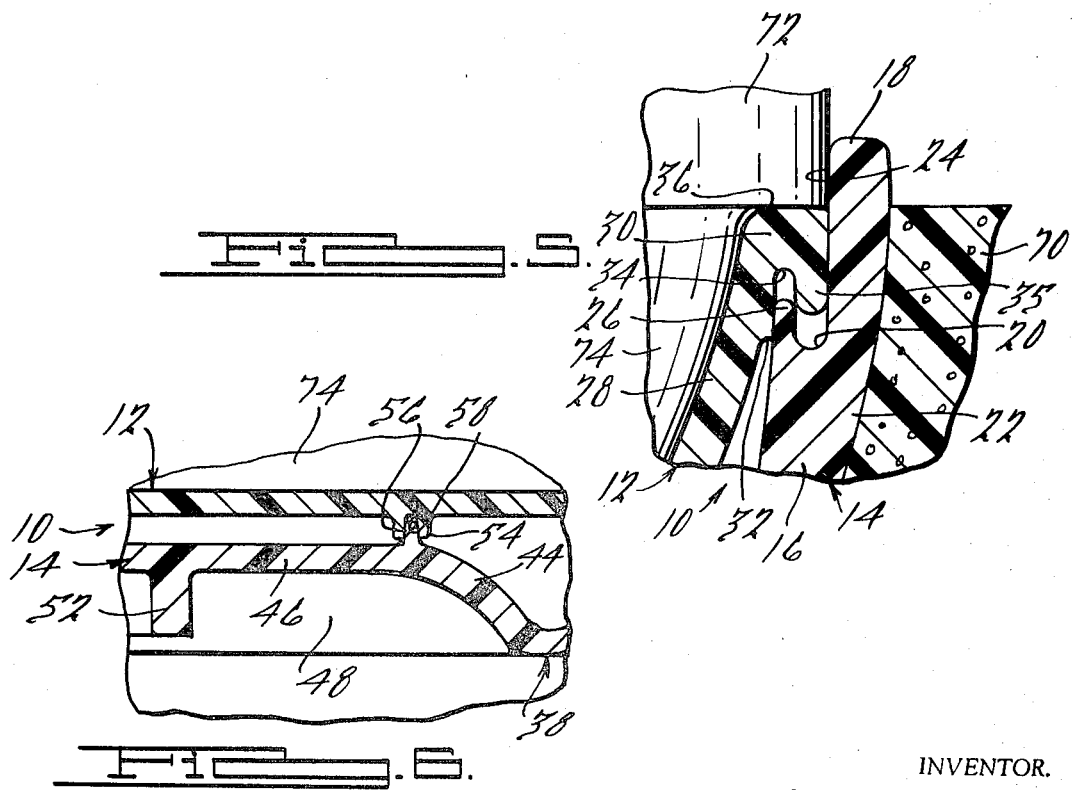
INVENTOR.
Fred R. Zumstein.
BY
Harness, Dickey & Pierce
ATTORNEYS.

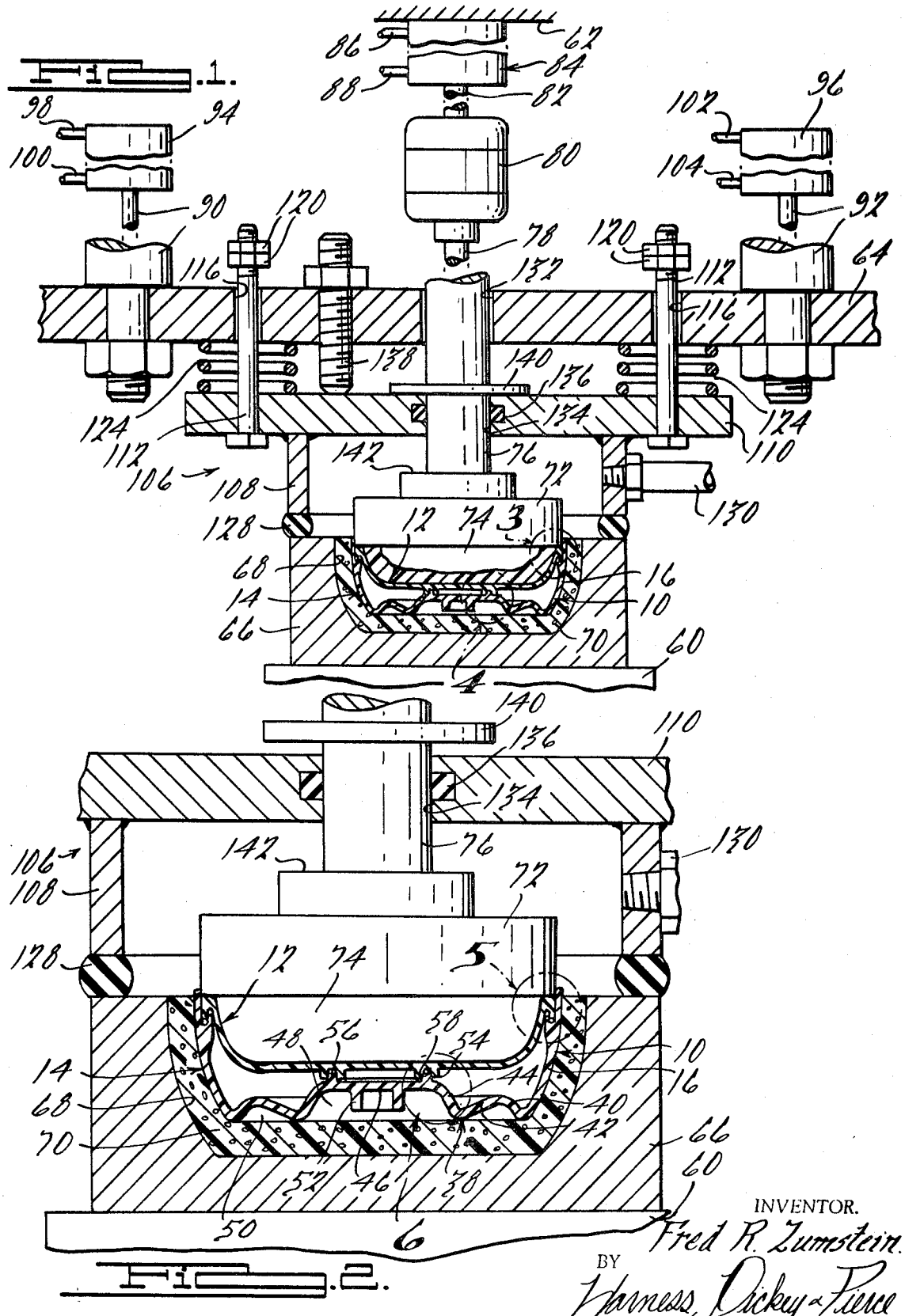

United States Patent Office 3,580,762
Patented May 25, 1971

3,580,762
METHOD OF MAKING DOUBLE-WALLED PLASTIC ARTICLES
Fred R. Zumstein, Detroit, Mich., assignor to King-Seeley Thermos Co., Ann Arbor, Mich.
Filed Jan. 23, 1969, Ser. No. 793,301
Int. Cl. B32b *31/00;* C09j
U.S. Cl. 156—73          4 Claims

ABSTRACT OF THE DISCLOSURE

A method of making double-walled, heat insulating plastic tableware or other plastic articles of a type having radially spaced inner and outer sets of seating and mating surfaces fused together by a spin welding operation.

BACKGROUND OF THE INVENTION

A spin welding apparatus suitable for use in making plastic articles of the above type is disclosed in the Decker et al. Pat. No. 3,244,574 which issued Apr. 5, 1966. This patent shows, by way of example, a small double-walled plastic coffee cup in which the inner and outer shells are spaced apart except at the peripheral edges. In practice, the two shells are fused together at the seating peripheral edges by holding one of the shells stationary in the welder while the other shell is rotated rapidly for a short period of time. Friction heats and softens the plastic material at the area of contact and causes the shells to fuse at the peripheries thereof when rotation is stopped.

The above method works very well for small articles of the type shown in the patent. However, difficulty has been experienced in practicing this method on larger double-walled articles such as plates, serving dishes, plate covers and the like wherein the two shells must be supported and fused together not only at the periphery of the article but also at one or more points spaced radially inwardly from the periphery. The different distances of the seating surfaces from the axis of rotation and the consequential differences in linear speeds of these surfaces during rotation make it difficult to obtain a proper fusion or weld at both or all areas of contact between the shells in a single spin welding operation.

SUMMARY OF THE INVENTION

The present invention solves the problem referred to above by making each inboard supporting surface slightly higher than the adjacent outward supporting surface so that contact occurs first at the inner surface and thus assures a longer contact time and greater localized pressure at the inner surface during the welding cycle whereby greater friction-induced heat is generated at the inner surfaces which effectively softens the plastic material at these surfaces and assures a proper weld. By the use of this technique, it is possible to make a double-walled insulated plastic article of any conventional relatively large size having inner and outer walls or shells fused together at a plurality of radially spaced points by a single spin welding operation.

DESCRIPTION OF THE DRAWINGS

FIG. 1 is a vertical sectional view, showing parts in section and parts in elevation, of a spin welding apparatus adapted for fusing two walls or shells of a relatively large plastic article of the type hereinabove referred to, the shells being shown fused together and the various parts of the welder being shown in the welding position, FIG. 2 is an enlarged view of the plastic article and parts of the spin welding apparatus immediately associated therewith, but illustrating the two shells of the article as they are at the beginning of the spin welding step, FIG. 3 is an enlarged, fragmentary sectional view of the portion of FIG. 1 enclosed in the circle 3, FIG. 4 is an enlarged, fragmentary sectional view of the portion of FIG. 1 enclosed in the circle 4, FIG. 5 is an enlarged, fragmentary sectional view of the portion of FIG. 2 enclosed in the circle 5, and FIG. 6 is an enlarged, fragmentary sectional view of the portion of FIG. 2 enclosed in the circle 6.

DESCRIPTION OF THE PREFERRED EMBODIMENT

The drawings show, by way of example, a double-walled plastic plate cover 10 as the article being welded according to the teachings of this invention, but it will be readily appreciated that the present invention is applicable to any kind of plastic article that requires, because of size or for other reasons, additional support inside the periphery thereof. The plate cover 10 here shown has spaced inner and outer walls or shells 12 and 14. The inner shell 12 is bowl-shaped and circular in form; and the outer shell 14 is similarly shaped but larger to provide a heat insulating space between the shells when the latter are joined together at the peripheries as shown in FIGS. 1 and 2. In general, the shells 12 and 14 should be made of a thermoplastic material. More specifically, polyolefin plastics are suitable for this purpose and polypropylene and polyethylene are typical examples of such plastics.

In the particular article 10 here by way of illustration, the annular side wall 16 of the outer shell 14 is formed at the inner side and below the peripheral edge 18 thereof with an upwardly facing annular groove 20. In order to provide for the groove 20 the side wall 16 is thickened at 22 from a point substantially below the groove; and the thickened section of the wall terminates flush with the groove opening. Thus, the thickened wall section 22, in effect, defines a radially inwardly extending ledge or shoulder below the peripheral edge 18. The groove 20 is formed in the ledge flush with the inner side 24 of the wall 16 and it defines a relatively thin upstanding annular flange 26 at the inner side of the groove.

On the other hand, the side wall 28 of the inner shell 12 is formed with a relatively thick peripheral rim portion 30 which joins the outer surface of the wall at a shoulder 32. A downwardly facing annular groove 34 in the rim portion 30 is dimensioned to accommodate and relatively closely receive the upstanding flange 26; and it defines a surrounding, depending, annular flange 35 which fits into and is snugly received by the groove 20. As perhaps best shown in FIGS. 3 and 5, the outer peripheral surface of the rim 30 flatly engages the inner side 24 of the wall 22 above the groove 20, and the top surface 36 of the rim 30 is essentially flat and substantially at right angles to the central axis of the shell 12 to define a radial shoulder extending radially inwardly from the surface 24 and spaced substantially below the rim edge 18 of the outer shell 14. By reason of the shoulder 32, the side walls of the inner and outer shells 12 and 14 are spaced substantially apart below the rim 30.

The bottom 38 of the outer shell 14 is rolled inwardly at 40 at the juncture thereof with the side wall 16 and then outwardly again at 42 primarily for appearance. At the inner edge of the portion 42 the bottom 38 is again rolled inwardly at 44 and is closed by a flat, central wall section 46. Thus, the configuration of the bottom 38 defines a shallow, central, outer well or depression 48 which is surrounded by an even shallower, relatively wide groove 50. Formed generally in the depression 48 is a narrow annular rib or flange 52.

The cover 10 is shown upside down in the drawings. Thus, in normal use, the bottom 38 of the outer shell 14 is the top of the cover; and it normally is equipped with a suitable knob (not shown) which snaps into or over the rib 52 to provide a handle for the cover. It is significant that the central portion of the bottom 38 is disposed only slightly below and generally parallel to the corresponding portion of the inner shell 12 as the two shells are joined together not only at the periphery but also by a central annular rib in order to add rigidity to the cover and to prevent flexing, buckling or crowning of the shells in use. To this end, the center portions of the shells 12 and 14 are provided at the inner sides thereof with annular ribs 54 and 56, respectively. The rib 56 extends in the direction of the inner shell 12; and the rib 54, which extends in the direction of the outer shell 14, is provided with an annular groove 58 which receives and snugly fits the rib 56.

In practice, the two shells 12 and 14 are formed separately preferably by a conventional molding operation; and, it is a feature of this invention that, when the shells are placed loosely together with the rib 56 in the groove 58 and the peripheral flanges 26 and 35 in their respective grooves 34 and 20, the rib 56 seats firmly in and substantially bottoms on the groove 58, as shown in FIG. 6, while the flanges 26 and 35 are spaced from the bottoms of the grooves 34 and 20 as shown in FIG. 5. As suggested, this relationship is critical to the present invention as it permits the two shells 12 and 14 to be fused together by a single conventional spin welding operation in a manner that assures a properly fused weld at both the inner and outer touching portions of the shells.

As indicated previously, the spin welding apparatus disclosed in the Decker et al. Pat. No. 3,244,574 is generally suited for use in fusing the shells 12 and 14 of the plate cover 10; and the disclosure of that patent, therefor, is incorporated by reference into this specification. The above notwithstanding, however, a description of the patented welder is given with particular emphasis on special features which adapt it for the particular purpose here at hand.

More particularly, the spin welder has a base 60, a stationary overhead frame member shown fragmentarily at 62, and an intermediate vertically movable carrier plate 64. A fixed, workpiece supporting block 66 mounted on the base 60 has an upwardly opening cavity 68 which is lined with a relatively thick layer 70 of a suitable elastic and resilient material such as cast rubber, urethane or elastomeric vinyl; and the liner is shaped to receive, snugly fit and frictionaly grip the outer shell 14 of the cover 10.

Spaced above the block 66 and directly over the cavity 68 is a reciprocally and rotatably driven mandrel 72 having thereon a depending pad 74 which preferably is of the same or similar elastic and resilient material as the liner 70. In the case of the particular article 10 here shown by way of example, the pad 74 is shaped to conform to the inner shell 12, as shown in FIG. 2 and it similarly snugly fits and frictionally grips the shell 12. The mandrel 72 is carried by a reciprocable and rotatable shaft 76 which is connected at the upper end thereof to the drive shaft 78 of a motor 80. The latter is connected to and carried by the piston rod 82 of a power cylinder 84 which is mounted on the frame member 62. Fluid under pressure from any suitable source is supplied to the cylinder 84 in the usual manner through pipes 86 and 88. It will be understood that the hydraulic or pneumatic system which serves the pipes 86 and 88 includes a valve for controlling the flow of fluid and the usual control means for supplying fluid to the cylinder either above or below the piston which carries and actuates the rod 82. When fluid under pressure is introduced into the cylinder 84 through pipe 86, the piston is advanced in the cylinder 84 to move the motor 80 and the shaft 76 downwardly to the position shown in FIGS. 1 and 2; and when the motor 80 is rotatably driven under these conditions, the inner shell 12 is rotated relative to the outer shell 14. Contrariwise, when fluid is introduced into the cylinder 84 through the pipe 88, the piston is retracted to raise the motor 80 and the shaft 76 and to separate the mandrel 72 from the block 66.

In double walled vessels or articles such as the cover 10, the space between the walls preferably is evacuated for enhanced heat insulating effect prior to and during the spin welding operation, and the spin welding apparatus here shown is equipped with means for doing this. To this end, the carrier plate 64 is attached to the piston rods 90 and 92 of the power cylinders 94 and 96. Fluid under pressure is carried to and from the power cylinder 94 through pipes 98 and 100 and fluid under pressure is similarly carried to and from the power cylinder 96 through pipes 102 and 104. As in the case of the cylinder 84, fluid under pressure preferably is delivered simultaneously to the power cylinders 94 and 96 from a pump or other suitable source; and flow of fluid to and from the cylinders is controlled by a suitable valve (not shown) according to conventional practice. Manifestly, when fluid under pressure is supplied to the cylinders 94 and 96 through pipes 98 and 102, the pistons therein advance and lower the carrier plate 64 and when fluid is supplied to the cylinders through pipes 100 and 104, the pistons retract and raise the carrier plate.

Carried by and depending from the plate 64 is a closure 106 which consists of a relatively short tubular or annular member 108 of substantially the same diameter as the block 66 and a header 110 which is welded or otherwise attached to the upper end of the member 108. The header 110 preferably extends radially outwardly from the tubular member 108 and a plurality of elongate rods 112 carried by and extending upwardly from the projecting portions of the header extend through openings 116 in the carrier plate 64. Nuts 120 on the rods 112 above the carrier plate 64 hold the closure 106 attached to the carrier plate while permitting limited relative movement therebetween. Compression springs 124 around the rods 112 between the carrier plate 64 and the header 110 hold the latter normally separated and spaced a maximum distance from the carrier plate. An annular sealing ring 128 of rubber or the mounted either on the top of the block 66 or on the bottom edge of the closure tube 108 seals the space between these members when the closure 106 is in fully lowered position shown in the drawing. A pipe 130 connected to the tubular member 108 and communicating with the interior thereof extends from a suction pump or the like (not shown) which evacuates the interior of the closure and the cavity of the block 66 when the closure 106 is in the lowered position. In this connection, it will be observed that the mandrel shaft 76 extends through openings 132 and 134 in the carrier plate 64 and header 110 respectively, and that the opening 134 is sealed by an O-ring 136.

Since the closure 106 is connected to and carried by the plate 64, it obviously raises and lowers with the latter. Thus, when the carrier plate 64 is retracted or raised by the power cylindes 94 and 96 from the fully lowered position shown in the drawing, it rises independently of the closure 106 until it engages the nuts 120. During the first part of this movement, the springs 124 simply open or extend to hold the closure 106 against the block 66; however, after the carrier plate 64 picks up the nuts 120, the closure retracts with the carrier plate and moves away from the block 66 so that access can be had to the cavity 68. Conversely, when the carrier plate 64 is lowered or advanced from the fully raised position by the power cylinders 94 or 96, the closure 106 remains separated or spaced from the carrier plate until it seats on the block 66. Thereafter, continued advancement of the carrier plate 64 compresses the springs 124 to apply pressure against the closure 106 and to maintain an effective seal between the closure and the block 66 so that the interior of the block 66 and the closure served by the vacuum tube 130 can be effectively evacuated. A stop 138 carried by the plate 64 above the closure 106 seats against the header 110 to limit collapsing movement between the header and the plate and to prevent overstressing of the springs 124.

In connection with the foregoing, it will be readily apparent that the power cylinder 84 advances and retracts the mandrel 72 with and at the same time as the carrier plate 64 but that the mandrel also has a limited reciprocable movement independently of the carrier plate and the closure 106. A collar 140 on the shaft 76 above the header 110 limits downward or advancing movement of the mandrel 72 and a shoulder 142 on the mandrel below the header 110 limits independent upward or retractive movement of the mandrel. In practice, the carrier plate 64, the closure 106 and the mandrel 72 normally are fully retracted to space the closure and the block 66 sufficiently apart so that the inner and outer shells 12 and 14 can be easily placed on the pad 74 and in the liner 70 respectively. While the pad 74 conforms relatively closely to the shape of the inner shell 12, it preferably is slightly larger or oversize with respect to the shell so that the material of the pad is compressed when the shell is place thereon. Similarly, while the cavity of the liner 70 conforms closely to the shape of the outer shell 14, it preferably is slightly smaller than the shell so that the material of the liner is expanded and compressed when the shell 14 is pushed into the cavity. The press-fit thus established between the inner shell 12 and the pad 74 and between the outer shell 14 and the liner 70 establishes a frictional driving connection between the shells and the supporting or backing material. Any material of the type suggested above and having a durometer reading between about 60 and about 70 is suitable for the liner 70 and the pad 74. A material of this elasticity or resiliency is sufficiently stiff to provide the necessary backing or support for the shells 12 and 14. At the same time it is sufficiently flexible and yieldable to accommodate the shells and it has proper characteristics for frictionally driving or rotating the shells during the spin welding operation.

After the shells 12 and 14 have been placed on the pad 74 and in the cavity of the liner 70 in the manner hereinabove described, fluid under pressure is supplied to the power cylinders 84, 94 and 96 to advance the mandrel 72 and the carrier plate 64. At the same time, the vacuum pump is started to extend suction through the pipe 130. The closure 106 seats on the block 66 before the mandrel 72 advances sufficiently to place the shells 12 and 14 together and as soon as the closure engages the block, suction from the pipe 130 begins to evacuate or reduce the pressure within the closure including the space between the two shells to below atmosphere pressure. The power cylinder 84 continues to advance the mandrel after the closure 106 has seated on the block 66 and it does so until the shells 12 and 14 are nested together as shown in FIG. 2. At this point in time, the collar 140 is spaced slightly from the header 110, the inner rib 56 is seated solidly in the groove 58 and the flanges 26 and 35 are received loosely in the grooves 34 and 20. The motor 80 is then energized to rotatably drive the mandrel 72 and inner shell 12. Since the outer shell 14 is held stationary by frictional engagement with the liner 70, the inner shell 12 rotates with the mandrel 72 and relative to the outer shell 14 and the contacting surfaces of the shells 12 and 14 are heated by friction sufficiently to soften the contacting surfaces so that they fuse together during the dwell period normally provided after rotation has stopped. A period of rotation of only a few seconds usually is sufficient for this purpose. However, since the inner flange 56 is fully seated before the outer peripheral flanges 26 and 35, there is greater pressure and consequently greater friction and heat at the inner flange during the initial rotating period. Thus, the surfaces of the inner flange 56 and groove 58 begin to soften and to flow together before this occurs at the outer flanges 26 and 35. However, as the inner flange 56 begins to soften and to flow into the groove 58 in the manner described, the shells 12 and 14 move a little closer together under pressure from the power cylinder 84 and the peripheral flanges 26 and 35 are pressed into their respective grooves 34 and 20 sufficiently so that friction causes the contacting surfaces thereof to soften and to flow together. Further, this action occurs in a shorter length of time at the outer flanges 26 and 35 because of the greater lineal speed of the periphery of the shell 12. Thus, a speed of rotation that softens and fuses the inner flange 56 at its relatively slow lineal speed also softens and fuses the outer flanges 26 and 35 because of their relatively greater lineal speed, and a proper fused connection between the shells at both the inner and outer areas of contact is assured.

In connection with the foregoing, it will be observed that the liner 70 supports the outer shell 14 at the inner end of the bottom section 42 relatively close to the flange 56 so that excessive deflection of the bottom away from the inner shell 12 during the period of rotation is prevented. Generally, the press-fit of the inner shell 12 on the pad 74 and of the outer shell 14 in the liner 70 holds the rim portion of the outer shell pressed against the peripheral surface of the inner shell rim portion 30. Thus, all of the contacting surfaces of the shells 12 and 14 are softened and fused together during the rotating cycle, and the annular joint between the inner and outer shells at the peripheries thereof is completely closed and sealed by the spin welding operation.

I claim:

1. The method of making plastic articles of the type having inner and outer complementary shells spaced apart over most of their area for heat insulating effect and provided with radially spaced inner and outer sets of mating and seating surfaces on the confronting inner sides thereof, said method comprising placing said shells together with the mating surfaces of each set in touching engagement and then fusing said mating surfaces together by rotating one of said shells relative to the other while maintaining said inner set of mating surfaces selectively initially under greater pressure than said outer set of mating surfaces 2. The method as set forth in claim 1 wherein said selective difference in pressure is achieved by making said inner supporting surface relatively higher than said outer supporting surface whereby the mating surfaces of said inner set engage each other before the mating surfaces of said outer set when said shells are first placed together.

3. The method as set forth in claim 1 wherein said shells are nested in conforming pads of yieldable flexible and resilient material which supports and frictionally grips the same during rotation thereof.

4. The method as set forth in claim 3 wherein the supporting pads are of a cast urethane material.

References Cited

UNITED STATES PATENTS

| 3,244,574 | 4/1966 | Decker et al. | 156—382 |
|---|---|---|---|
| 3,275,179 | 9/1966 | Lux et al. | 156—73 |
| 3,276,616 | 10/1966 | Lurie | 156—73 |
| 3,446,688 | 5/1969 | Flax | 156—306 |

SAMUEL FEINBERG, Primary Examiner

U.S. Cl. X.R.

156—382, 306